United States Patent [19]

Rothschild

[11] 4,086,907
[45] May 2, 1978

[54] HEAT STORAGE DISH

[75] Inventor: Henry H. Rothschild, Cherry Hill, N.J.

[73] Assignee: Caddy Corporation of America, Pitman, N.J.

[21] Appl. No.: 721,527

[22] Filed: Sep. 8, 1976

[51] Int. Cl.² .................................................. A47G 23/04
[52] U.S. Cl. ....................................... 126/246; 126/375
[58] Field of Search ............................ 126/246, 400, 374

[56] References Cited

U.S. PATENT DOCUMENTS 3,734,077  5/1973  Murdough et al. ................... 126/246
3,837,330  9/1974  Lanigan et al. ....................... 126/246

Primary Examiner—Edward G. Favors
Attorney, Agent, or Firm—Pasquale A. Razzano

[57] ABSTRACT

A heat storage dish for use with food serving ware such as a plate or the like has upper and lower dish walls of generally complementary peripheral configuration, with the walls being secured together at their peripheries and the remainder of the walls being spaced from each other to define a cavity therebetween. A heat storage plate is positioned in the cavity between the walls, and the plate has at least one opening formed therein. The plate is held in close heat transfer relation to the upper wall by a flange support member which is secured to the upper wall and extends through the openings to a pair of outwardly extending flanges on which the plate is supported. A layer of heat insulating material extends entirely across the bottom of the plate, between the bottom of the plate and the bottom wall, to prevent heat losses from the plate through the bottom wall of the dish.

13 Claims, 4 Drawing Figures

U.S. Patent  May 2, 1978  4,086,907
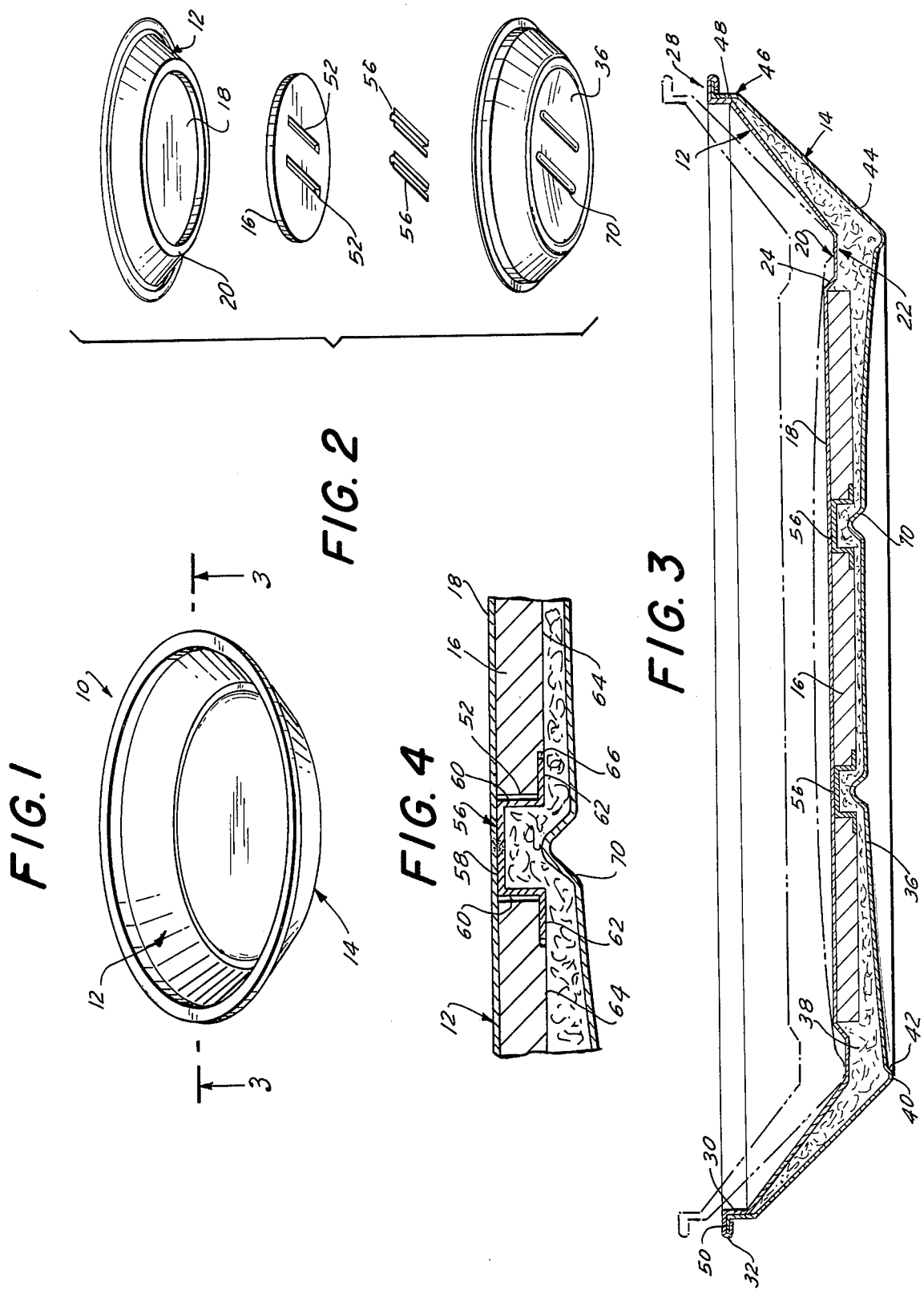

HEAT STORAGE DISH

The present invention relates to heat storage dishes designed for receiving food serving ware such as a plate or the like to keep the plate warm.

Heat storage dishes of various types have been provided in the past for use by hospitals and other institutions for keeping food serving dishes warm during transfer from the kitchen to the patient or guest. Such previously proposed heat storage dishes usually have upper and lower walls welded to each other at their peripheries to form a double walled dish having a cavity in its interior. A heavy heat storage plate is typically provided in this cavity to act as a heat sink which is used to keep a plate on the dish warm.

Such previously proposed heat storage dishes have several problems which must be solved in order for them to operate satisfactorily. In particular the heat storage plate, or heat sink, is preferably held in tight close heat transfer relation to the upper wall, so that maximum heat transfer capability is provided. In addition, although the internal cavities in such plates are usually evacuated, the air which remains in the cavity, when heated, can cause the walls of the dish to expand or bulge so that the dish becomes unstackable, or can even burst. One solution to this problem is disclosed in U.S. Pat. No. 3,557,774 wherein the bottom wall of the dish is welded to the upper wall through a central opening in the heat storage plate with the bottom wall being further provided with an expansion section (or wrinkle) which allows deformation of the plate to take place in a predetermined location, within limits, so that the dish retains its usefulness. However, because the walls of the dish are welded together, heat losses occur at the center of the dish and the dish cannot be fully insulated across its bottom.

Accordingly, it is an object of the present invention to provide a heat storage dish which provides uniform heat transfer between the heat storage plate and the upper surface of the dish.

Another object of the present invention is to provide a heat storage dish which is relatively simple in construction and economical to manufacture.

A still further object of the present invention is to provide a heat storage dish which provides for controlled deformation of the bottom wall of the dish in the event the dish is overheated.

Another object of the present invention is to provide a heat storage dish which is readily stacked.

A still further object of the present invention is to provide a heat storage dish which permits the entire bottom of the dish to be insulated.

In accordance with an aspect of the present invention a heat storage dish is provided which has upper and lower dish walls of generally complementary peripheral configuration with the walls being secured together at their peripheries and the remainder of the walls being spaced from each other to define an internal cavity therebetween. A heat storage plate is positioned in this cavity between the walls and has at least one generally rectangular opening formed therein. An inverted U-shaped channel member is located within this cavity and has its base secured to the upper wall and a pair of spaced leg portions extending downwardly through the opening in the heat storage plate. The channel has a pair of opposed flanges integrally formed with its legs and these flanges extend perpendicularly outwardly therefrom below the plate to support the plate against the upper wall. The plate is spaced from the bottom wall of the dish so that a layer of heat insulating material can be placed across the entire bottom of the heat storage plate to prevent heat losses through the bottom wall of the dish.

The above, and other objects, features and advantages of this invention will be apparent in the following detailed description of an illustrative embodiment thereof, which is to be read in connection with the accompanying drawings, wherein:

FIG. 1 is a perspective view of a heat storage dish constructed in accordance with the present invention;

FIG. 2 is an exploded perspective view of a heat storage dish shown in FIG. 1;

FIG. 3 is a longitudinal sectional view taken along lines 3—3 of FIG. 1, and showing, in phantom lines, how the dishes are stacked; and FIG. 4 is an enlarged partial sectional view of a portion of the plate shown in FIG. 3.

Referring to the drawing in detail, and initially to FIG. 1 thereof, a heat storage dish 10 constructed in accordance with the present invention is adapted to hold food serving ware, such as a plate and keep the food which is on the plate heated and warm. In the illustrative embodiment of the present invention the heat storage dish is a relatively flat circular dish or bowl, although it is contemplated that the dish can have other peripheral configurations.

Dish 10 includes a pair of upper and lower wall members 12, 14 and a heat storage plate or heat sink 16 mounted between walls 12, 14, for the purpose of retaining heat in the plate and transferring it to the top wall of the dish, in order to heat a food serving plate or the like positioned in the dish. As seen most clearly in FIGS. 2 and 3, upper wall 12 includes a circular base 18 which is surrounded by an annular recess or shoulder 20. Base 18 is relatively flat and shoulder 20 includes a flat annular surface portion 22 between inclined walls 24, 26. Inclined wall 24 forms a transition from base 18 to shoulder 22, while inclined wall 26 is longer than the inclined wall 24 and forms a rim or side wall for the dish. The peripheral edge 28 of side wall 26 is bent to extend vertically along a vertical wall portion 30 and then is bent radially outwardly along an annular flange portion 32. This flange is bent over, as seen in FIG. 3, to surround the peripheral edge 34 of bottom wall 14 thereby to form a waterproof rim in the plate.

Bottom wall 14 has a base portion 36 which is generally circular in plan and has a concave configuration curving towards the bottom wall 18 of plate 12 and opening outwardly of the dish. Concave wall 36 is spaced from wall 18 so as to define a cavity 38 within the plate.

The periphery of base 36 includes an annular shoulder 40 which is smaller than, but similar to, shoulder 20 of upper plate 12. It is defined by inclined or curved walls 42, 44 on opposite sides thereof. Inclined wall 44 is formed at a slightly greater angle than wall 26 so that the side walls of members 12, 14 converge towards each other at their peripheries. The edge 46 of side wall 44 is bent upwardly to form a small vertical wall 48 that has its free end flared outwardly to form the flange 34 that is received within the bent flange 32, of upper member 12.

The heat sink or plate 16 is a circular disc formed of a good heat storage material such as aluminum, and its peripheral configuration is selected to substantially correspond to the periphery of the bottom portion 18 of wall 12. The plate includes a pair of rectangular slots 52 which receive channel members 56. These channels are inverted, as illustrated in FIGS. 3 and 4, and have a base or bight portion 58 from which a pair of spaced legs 60 depend downwardly. The channel legs are received in their associated slots 52 and the ends of the legs 60 are provided with integral outwardly extending flanges 62. These flanges underlie the bottom surface 64 of plate 16 and thus support the plate against base portion 18 of upper wall 12. In order to insure intimate contact between the wall 12 and plate 16, the height of legs 60 is selected such as to be substantially equal to the thickness of plate 16. In addition, the plate is provided with recesses 66 formed adjacent openings 52 which receive flanges 62 so that the bottom surface of the plate is relatively flat. This insures that base portion 36 of wall 14 is spaced from plate 16 throughout its entire extent. This space is occupied by a layer of heat insulating material, such as for example rock wool or the like, thereby to prevent heat loss from plate 16 through the bottom wall 14 of the dish.

Preferably base portion 36 of bottom wall 14 is provided with indents or corrugations 70 formed to align with channels 56 and openings 52. These indentations are generally triangularly shaped bends in the bottom wall of the plate and permit expansion or deformation of the bottom wall when the plate is heated, without interfering with the ability of the plates to stack. Likewise the concave configuration of base portion 36 of the bottom wall 14 permits the base portion to expand outwardly should the dish become overheated. However, because of the concave configuration of the base portion, the base itself provides substantial resistance to such expansion and makes the bottom of the plate relatively strong. Moreover, the shoulder portions of the upper and lower walls serve to limit expansion or deformation of the plate to these defined areas, so that if bulging occurs it does not detract from the ability of the bowls to stack. And, shoulder 20 formed in the upper wall 12, also provides an annular ring or recess in the dish which is adapted to receive the support bead usually provided on food plates or the like, thus cooperating with the plate to resist sliding of the plate out of the heat storage dish.

It will be apparent, the dish of the present invention is preferably formed from a metal material, such as chromium nickel sheet steel, as are the channels 56. This construction enables the channels to be spot welded to the bottom of the top wall 16 in a rapid and simple operation.

Accordingly it is seen that a relatively simply constructed heat storage dish is provided which is relatively strong and resists bulging should the plate be overheated. Moreover, the support of the heat storage plate 16 against the upper wall 12, in intimate contact relationship, insures uniform heat transfer while the ability to insulate the entire bottom of the plate insures that heat losses through the bottom of the dish are kept to a minimum.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A heat storage dish comprising upper and lower dish walls having a generally complementary peripheral configuration, said walls being secured together at their peripheries with the remainder of the walls being spaced from each other to define a cavity therebetween, a heat storage plate positioned in said cavity between said walls, said plate having at least two elongated generally rectangular openings formed therein; means respectively associated with said openings and secured to said upper wall and extending through said openings for supporting said plate against said upper wall, said means each comprising an inverted U-shaped channel having a base and a pair of spaced leg portions, said base being secured to said upper wall and said legs extending downwardly therefrom through their associated openings; said legs having lower ends, including a pair of oppositely directed flanges extending outwardly from said legs below said plate and on which said dish is supported; and heat insulating material positioned in said cavity between said plate and said bottom wall extending entirely across said plate and beneath said channels to resist heat transfer from the plate through said bottom wall.

2. A heat storage dish as defined in claim 1 wherein said plate has a bottom surface including recesses adjacent said opening for receiving said flanges.

3. A heat storage dish as defined in claim 1 wherein said bottom wall includes a concave base portion curving towards said upper wall.

4. A heat storage dish as defined in claim 3 wherein said concave bottom wall has an expansion deformation formed therein aligned with and extending into said opening.

5. A heat storage dish as defined in claim 4 wherein said expansion deformation comprises a heat section of the wall defining a triangular channel in cross section opening outwardly of the bottom wall.

6. A heat storage dish as defined in claim 3 wherein said dish is circular in plan and said base portion is also circular in plan, said bottom wall having an annular support shoulder formed therein about the periphery of said base portion and an outwardly slanting peripheral wall portion extending from said shoulder to the peripheral edge of the bottom wall wherein the bottom wall is secured to said top wall.

7. A heat storage dish comprising upper and lower dish walls having a generally complementary peripheral configuration, said walls being secured together at their peripheries with the remainder of the walls being spaced from each other to define a cavity therebetween; a heat storage plate positioned in said cavity between said walls, said plate having a pair of elongated generally rectangular openings formed therein; a pair of inverted U-shaped channels respectively associated with said openings and located in said cavity, said channels each having a base portion secured to said upper wall and a pair of spaced leg portions extending downwardly through its associated opening, said channels each having a pair of opposed flanges integrally formed with said legs and extending perpendicularly outwardly therefrom below said plate thereby to support said plate against said upper wall; said legs having a length substantially equal to the thickness of said plate whereby said plate is held closely against the upper wall throughout substantially its entire extent to insure uniform heat transfer therebetween; said bottom wall being spaced from said plate throughout its entire extent; and a layer of heat insulating material positioned in said cavity and extending entirely across said plate beneath said channels between the plate and the bottom wall.

8. A heat storage dish as defined in claim 7 wherein said plate has a bottom surface including recesses formed therein on opposite sides of said openings for receiving said flanges.

9. A heat storage dish as defined in claim 7 wherein said bottom wall includes a concave base below said plate which curves towards the plate and opens outwardly of the dish.

10. A heat storage dish as defined in claim 9 wherein said concave bottom wall has an expansion deformation formed therein aligned with and extending into said opening.

11. A heat storage dish as defined in claim 10 wherein said expansion deformation comprises a heat section of the wall defining a triangular channel in cross section opening outwardly of the bottom wall.

12. A heat storage dish as defined in claim 9 wherein said dish is circular in plan and said base portion is also circular in plan, said bottom wall having an annular support shoulder formed therein about the periphery of said base portion and an outwardly slanting peripheral wall portion extending from said shoulder to the peripheral edge of the bottom wall wherein the bottom wall is secured to said top wall.

13. A heat storage dish as defined in claim 8 including heat insulating material positioned in said cavity between said plate and said bottom wall extending entirely across said plate to resist heat transfer from the plate through said bottom wall.

* * * * *